(12) United States Patent
Lin

(10) Patent No.: US 7,929,444 B2
(45) Date of Patent: Apr. 19, 2011

(54) COMMUNICATION NODES AND METHODS USING SMALL ROUTERS TO COMMUNICATE OVER A BACKHAUL FACILITY

(75) Inventor: Sheng Ling Lin, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1601 days.

(21) Appl. No.: 11/090,114

(22) Filed: Mar. 25, 2005

(65) Prior Publication Data

US 2006/0215667 A1   Sep. 28, 2006

(51) Int. Cl.
*G01R 31/08* (2006.01)
*G06F 11/00* (2006.01)
*H04W 4/00* (2009.01)
*H04B 7/212* (2006.01)

(52) U.S. Cl. .................... 370/235; 370/328; 370/348

(58) Field of Classification Search .............. 370/216, 370/217, 218, 221, 225, 229, 230, 230.1, 370/231, 232, 235
See application file for complete search history.

(56) References Cited

U.S. PATENT DOCUMENTS

| | | | |
|---|---|---|---|
| 5,119,366 A * | 6/1992 | Ardon et al. | 370/378 |
| 6,192,037 B1 * | 2/2001 | Spear | 370/315 |
| 6,347,228 B1 * | 2/2002 | Ludden et al. | 455/456.5 |
| 6,477,375 B1 * | 11/2002 | Ho et al. | 455/445 |
| 6,625,473 B1 * | 9/2003 | Seok | 455/560 |
| 6,668,167 B2 * | 12/2003 | McDowell et al. | 455/412.1 |
| 6,782,262 B1 * | 8/2004 | Lundborg | 455/449 |
| 6,854,013 B2 * | 2/2005 | Cable et al. | 709/226 |
| 6,950,412 B2 * | 9/2005 | Lee et al. | 370/310.2 |
| 2003/0176163 A1 * | 9/2003 | Gosewehr | 455/3.04 |
| 2003/0237016 A1 * | 12/2003 | Johnson et al. | 714/4 |
| 2004/0071153 A1 * | 4/2004 | Jasper et al. | 370/431 |
| 2004/0114623 A1 * | 6/2004 | Smith | 370/466 |
| 2006/0203737 A1 * | 9/2006 | Bugenhagen | 370/252 |

* cited by examiner

*Primary Examiner* — Chirag G Shah
*Assistant Examiner* — Ashley L Shivers
(74) *Attorney, Agent, or Firm* — Duft, Bornsen & Fishman

(57) ABSTRACT

For a wireless network, communication nodes (such as a Mobile Switching Center) are disclosed that include at least ten small routers. The small routers handle traffic received from a plurality of base stations over a backhaul facility. The backhaul facility transports the traffic between the base stations and the small routers using Internet Protocol (IP). A small router in the communication node is defined as a router that is to handle 10% or less of the traffic for the communication node as configured. The percentage to be handled by a router is based on the configuration of the communication node.

10 Claims, 5 Drawing Sheets

COMMUNICATION NODES AND METHODS USING SMALL ROUTERS TO COMMUNICATE OVER A BACKHAUL FACILITY

BACKGROUND OF THE INVENTION

1. Field of the Invention

The invention is related to the field of communication networks, and in particular, to communication nodes and methods of a wireless network using a plurality of small routers to communicate over a backhaul facility.

2. Statement of the Problem

Wireless networks are comprised of a plurality of base stations, where each base station provides a service area termed a "cell". Mobile phones in the service area of a base station are able to communicate with the base station to receive the wireless service. The base stations transmit voice, data, and signaling traffic from the mobile devices over a backhaul facility to a communication node, such as a Mobile Switching Center (MSC). The backhaul facility frequently comprises T1 lines from the base stations to the MSC. Wireless service providers often lease the T1 lines from telephone companies or cable companies. The cost of leasing the T1 lines constitutes a substantial portion of the operating budget of the service providers. Because of the cost of T1 lines, the backhaul facility is generally not configured redundantly for reliability.

Many wireless networks use Frame Relay protocol as the transport protocol over the backhaul facility. FIG. 1 illustrates a wireless network 100 using Frame Relay as the transport protocol over the backhaul facility. Wireless network 100 includes a plurality of base stations 111-113 connected to an MSC 120 over a backhaul facility 130. Although three base stations 111-113 are shown, those skilled in the art understand that MSC 120 can serve many more base stations. Backhaul facility 130 comprises a plurality of T1 lines 131-133. Wireless network 100 uses Frame Relay (FR) protocol for transporting traffic over the T1 lines 131-133. Each base station 111-113 includes a transmission interface 115-117 for terminating the T1 lines 131-133. MSC 120 includes a switch 122, such as a 5ESS switch, for terminating the T1 lines 131-133.

For each incoming T1 line, switch 122 duplicates the incoming T1 line into redundant lines for backup. One of the redundant lines is in active mode while the other line is in standby mode. The redundant lines in this architecture add reliability to wireless network 100.

Internet Protocol (IP) has been suggested as a transport protocol over the backhaul facility. FIG. 2 illustrates a wireless network 200 using IP as the transport protocol over the backhaul facility. Wireless network 200 includes a plurality of base stations 211-213 connected to an MSC 220 over a backhaul facility 230. Backhaul facility 230 comprises a plurality of T1 lines 231-233, a Digital Connect (DACS) 234, and a plurality of DS-3 lines 236-237. Each base station 211-213 includes a transmission interface 215-217 for terminating the T1 lines 231-233. MSC 220 includes two large routers 222-223 for terminating the DS-3 lines 236-237. The T1 lines 231-233 connect between DACS 234 and the transmission interfaces 215-217 in base stations 211-213. The DS-3 lines 236-237 connect between DACS 234 and large routers 222-223. Wireless network 100 uses IP for transmitting traffic over the T1 lines 131-133 and the DS-3 lines 236-237.

A large router is defined as a router that is to handle more than 10% of the traffic for MSC 220 as configured. The percentage of traffic to be handled by a router is based on the configuration of MSC 220. In FIG. 2, there are two large routers 222-223, and each large router 222-223 is assumed to handle 50% of the traffic for MSC 220 as configured (assuming reasonable load balancing between the large routers 222-223). Actual traffic handled by each of large routers 222-223 may be below the 10% level in operation, such as late at night or other low-traffic times.

One problem with the architecture for using IP over the backhaul facility 230 shown in FIG. 2 is reliability. The large routers 222-223 used in the MSC 220 do not duplicate the incoming DS-3 lines 236-237 into redundant lines for backup, as is done in switch 122 in FIG. 1 for Frame Relay. Therefore, if one of the large routers 222-223 fails, there may be a 50% traffic loss in MSC 220. A 50% traffic loss unfortunately exceeds the threshold (10%) of outage counting rules set by the TL 9000 and/or the GR 1929. For instance, TL 9000 establishes a common set of quality system requirements for suppliers of telecommunication systems, hardware, software, and services. The TL 9000 requirements include a minimum set of performance metrics and indicators to measure progress and evaluate results of quality system implementation. The TL 9000 counting rules provide that suppliers of telecommunication systems, hardware, software and services have a traffic loss no greater than 10% traffic loss. Therefore, a 50% traffic loss, as could happen in wireless network 200, would be counted as an outage.

SUMMARY OF THE SOLUTION

The invention solves the above and other related problems by configuring a communication node, such as an MSC, with a plurality of small routers instead of large routers to handle IP traffic over a backhaul facility. According to the invention, the communication node includes at least ten small routers. The communication node is implemented or is to be implemented in a wireless network that includes a plurality of base stations and a backhaul facility connecting the base stations to the small routers in the communication node. The base stations provide wireless service to mobile devices and transport traffic over the backhaul facility to the communication node. The backhaul facility transports the traffic between the base stations and the small routers of the communication node using IP. The small routers are configured to receive and handle the traffic.

A small router in the communication node is defined as a router that is to handle 10% or less of the traffic for the communication node as configured. The percentage to be handled by a router is based on the configuration of the communication node. For instance, if there are ten small routers in the communication node, then each of the ten small routers is assumed to handle about 10% of the traffic as configured (assuming reasonable load balancing of the traffic across the ten small routers). If there are twelve small routers in the communication node, then each of the twelve small routers is assumed to handle about 8% of the traffic. Actual traffic in any of the small routers may exceed the 10% level in operation, such as with bursts of traffic during high-traffic times, which falls within the scope of the invention.

The use of at least ten small routers in the communication node advantageously mitigates the reliability problems of using large routers in the communication node. If one of the small routers were to fail, then the communication node is assumed to suffer a 10% or less traffic loss as configured. The 10% or less traffic loss satisfies the set of performance metrics provided under the TL 9000 counting rules for suppliers of telecommunication systems, hardware, software, and services, as configured.

In actual operation, if one of the small routers does fail, then the communication node will probably suffer a 10% or less traffic loss (assuming reasonable load balancing among the small routers). Thus, communication node will probably satisfy the set of performance metrics provided under the TL 9000 requirements in actual operation.

The invention may include other exemplary embodiments described below.

DESCRIPTION OF THE DRAWINGS

The same reference number represents the same element on all drawings.

DETAILED DESCRIPTION OF THE INVENTION

Figure 1:
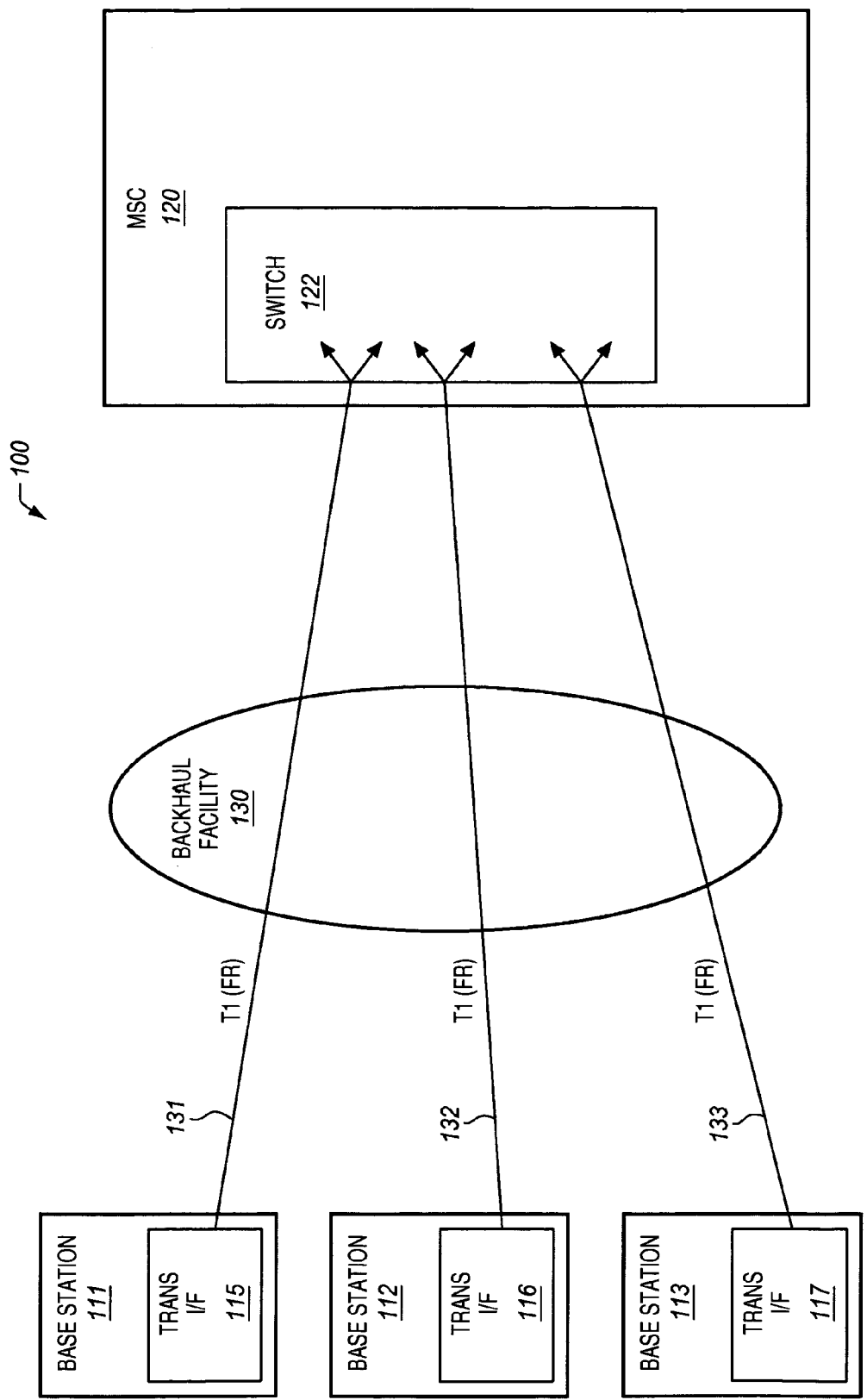
FIG. 1 illustrates a wireless network using Frame Relay as the transport protocol over a backhaul facility in the prior art.
Figure 2:
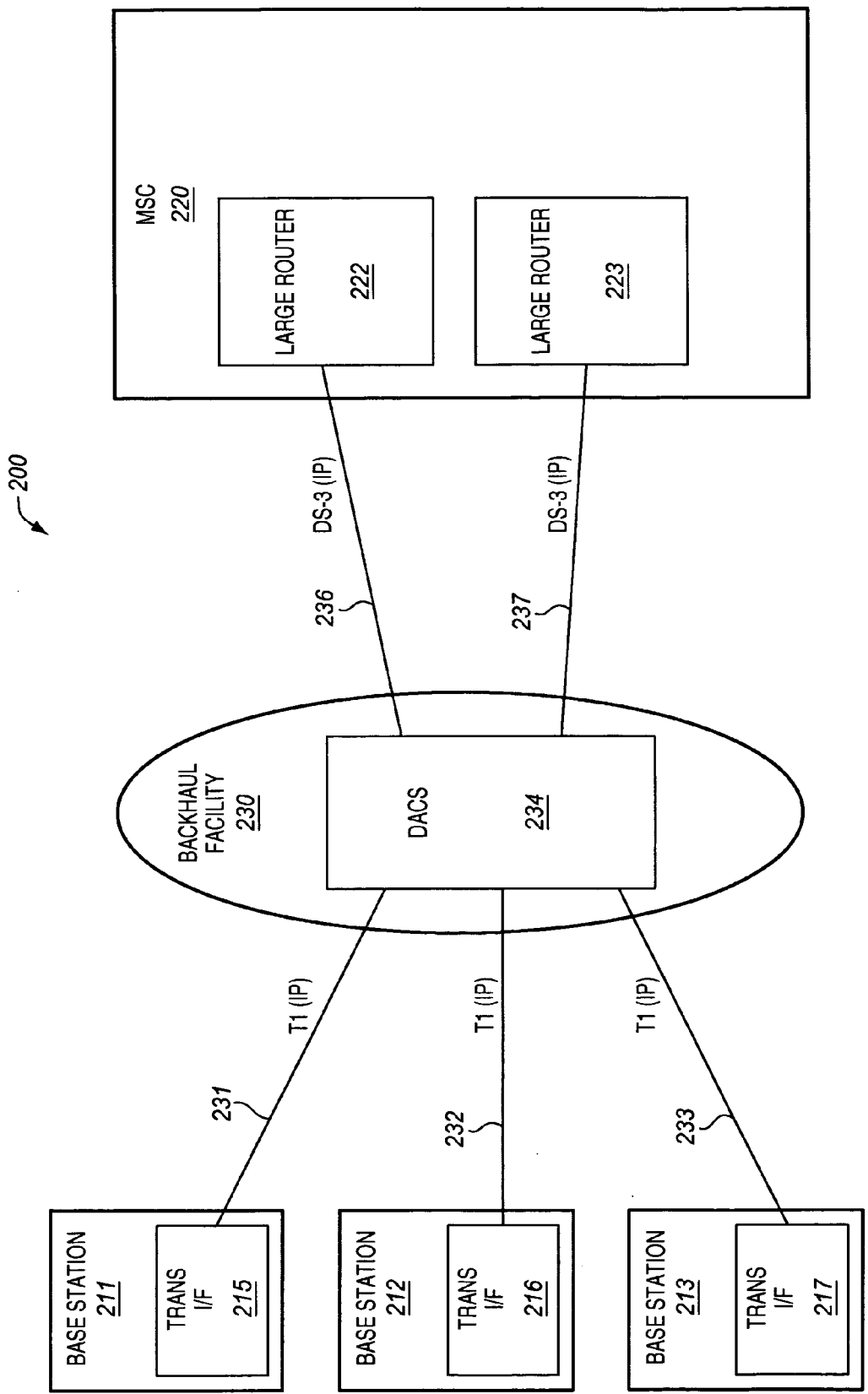
FIG. 2 illustrates a wireless network using Internet Protocol (IP) as the transport protocol over a backhaul facility in the prior art.
Figure 3:
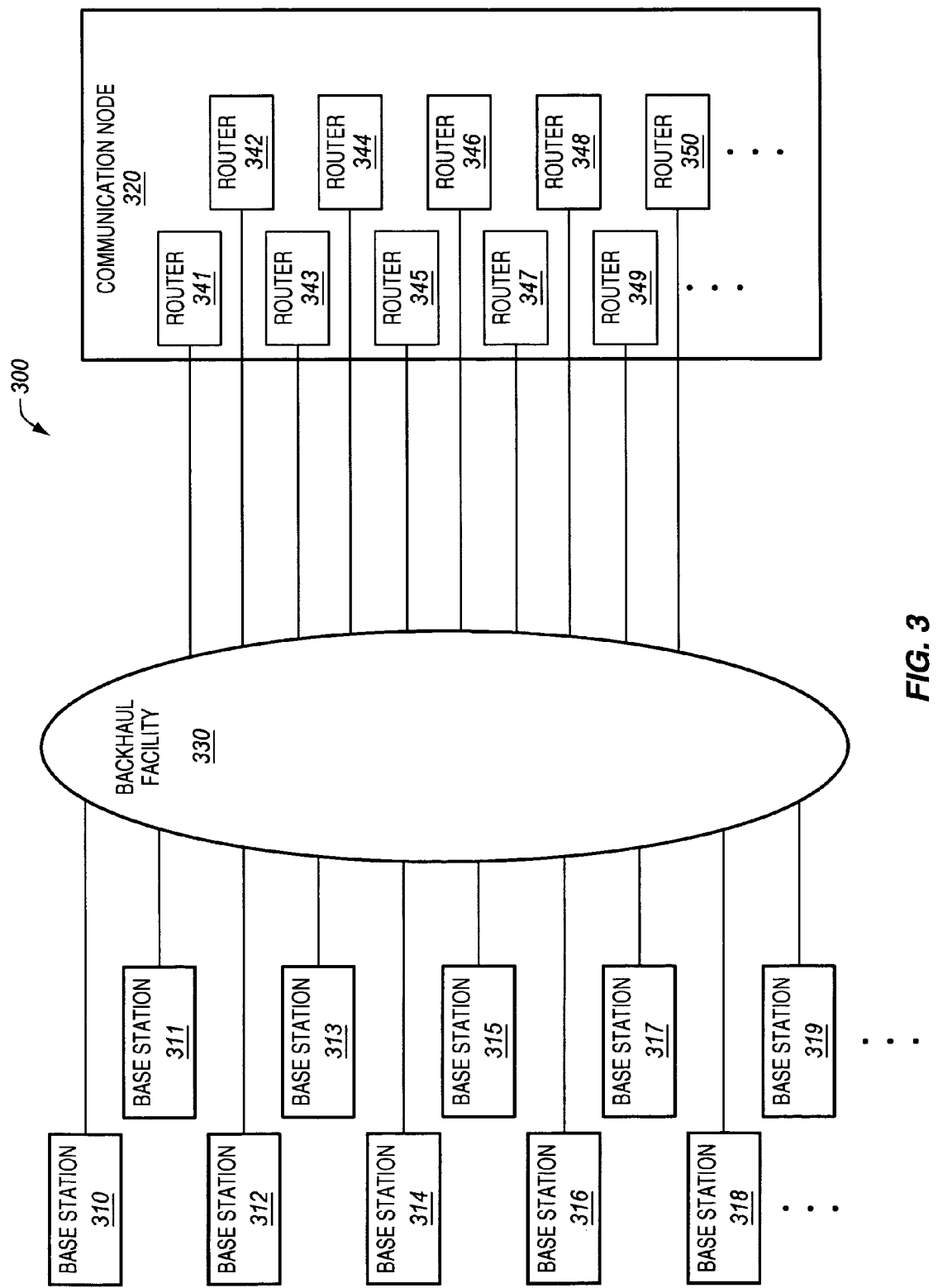
FIG. 3 illustrates a wireless network using IP as the transport protocol over a backhaul facility in an exemplary embodiment of the invention.
Figure 4:
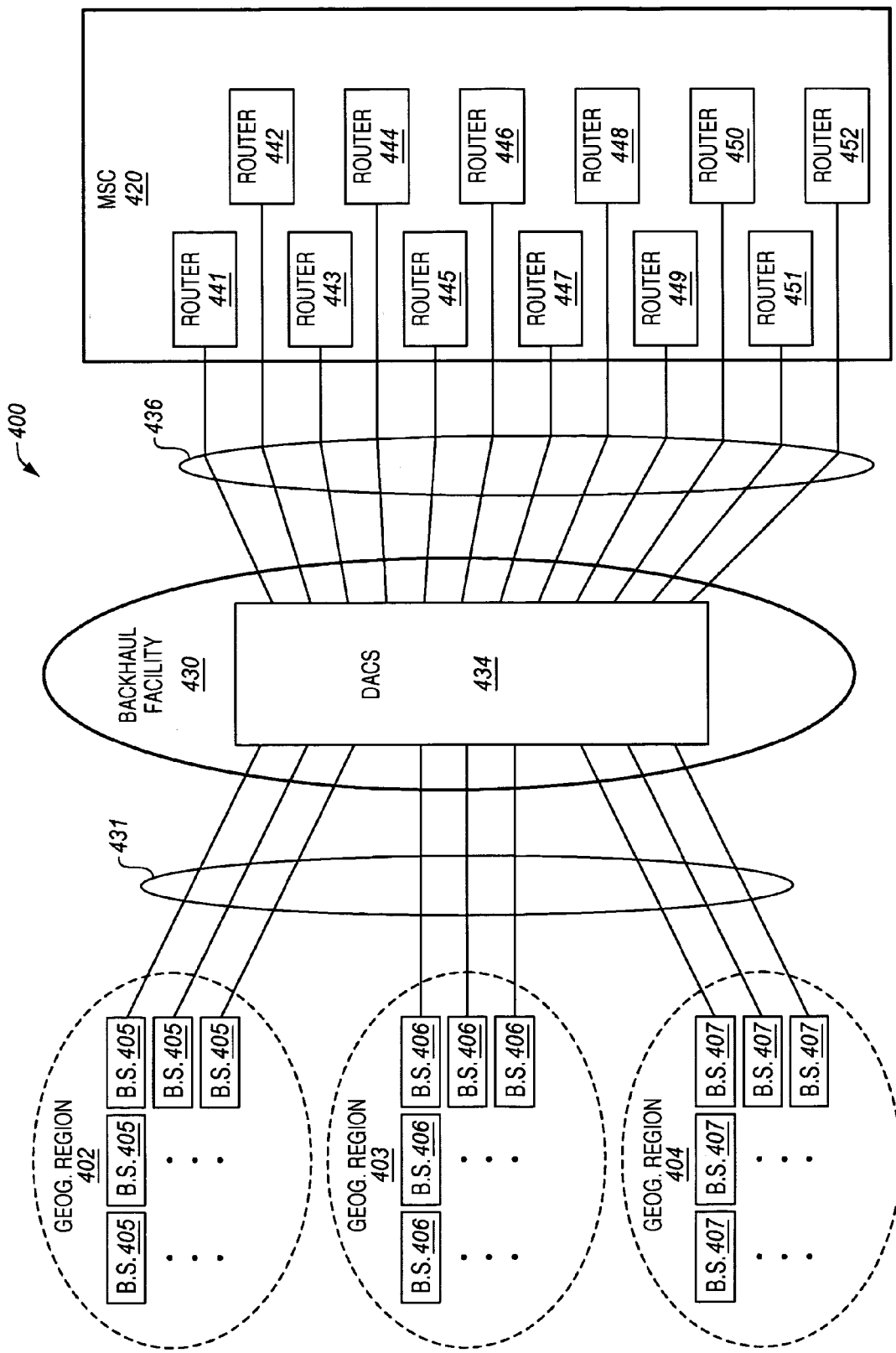
FIG. 4 illustrates another wireless network using IP as the transport protocol over a backhaul facility in an exemplary embodiment of the invention.
Figure 5:
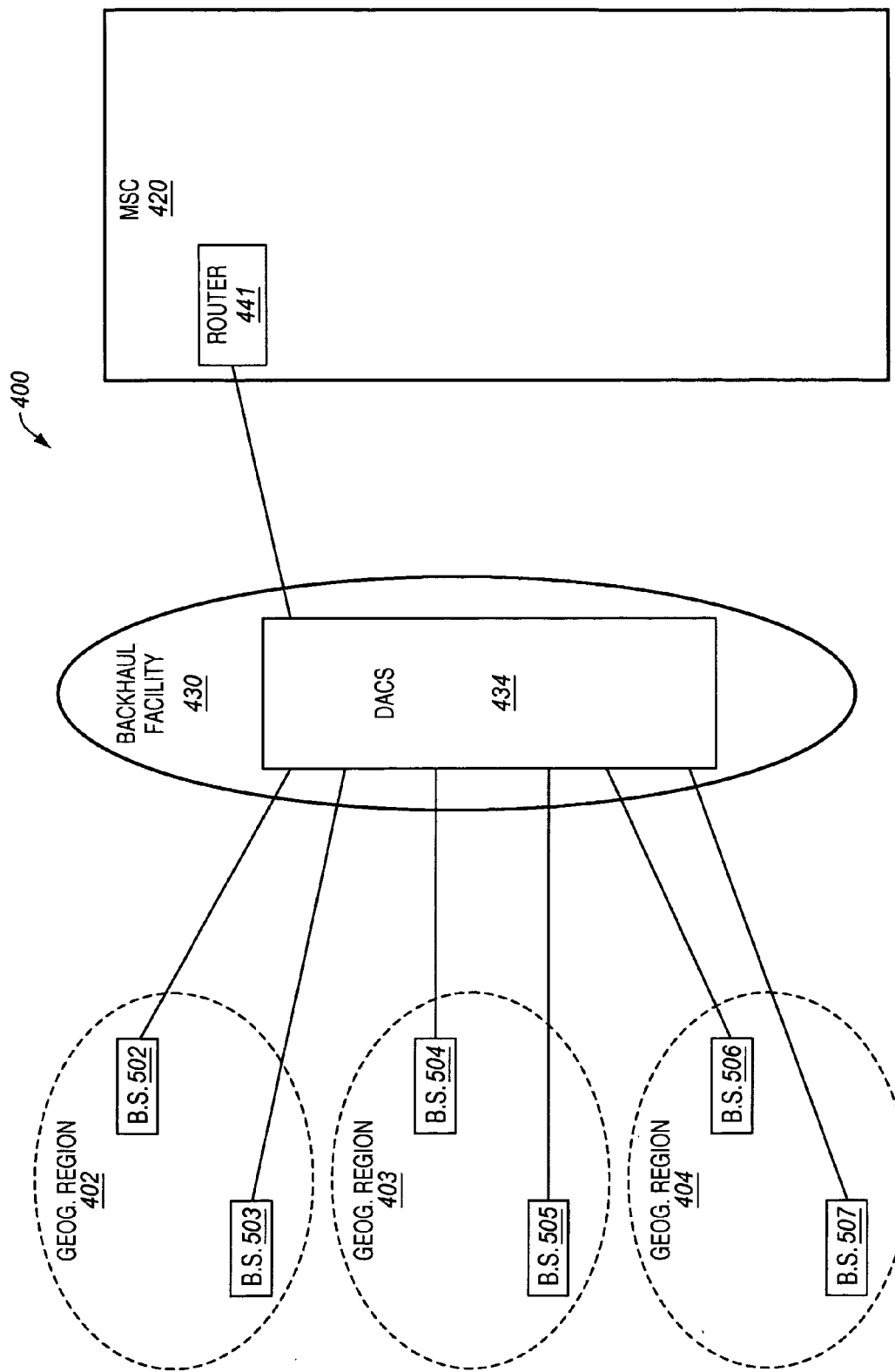
FIG. 5 illustrates interleaving for a small router in a wireless network in an exemplary embodiment of the invention.

FIGS. 3-5 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 3 illustrates a wireless network 300 using Internet Protocol (IP) as the transport protocol over a backhaul facility in an exemplary embodiment of the invention. Wireless network 300 includes a plurality of base stations 310-319, a communication node 320, and a backhaul facility 330 connecting base stations 310-319 to communication node 320. Communication node 320 includes at least ten small routers 341-350. Each small router 341-350 connects to backhaul facility 330 and is configured to receive traffic from and transmit traffic to backhaul facility 330. Wireless network 300 may include other networks, systems, or devices not shown in FIG. 3.

A small router 341-350 is defined as a router that is to handle 10% or less of the traffic for communication node 320 as configured. To handle traffic means to receive, route, or otherwise process traffic. The percentage to be handled by a router is based on the configuration of communication node 320. For instance, if there are ten small routers in communication node 320, then each of the ten small routers is assumed to handle about 10% of the traffic as configured (assuming reasonable load balancing of the traffic across the ten small routers). If there are twelve small routers in communication node 320, then each of the twelve small routers is assumed to handle about 8% of the traffic. Actual traffic in any of small routers 341-350 may exceed the 10% level in operation, such as with bursts of traffic during high-traffic times, which falls within the scope of the invention. The benchmark is if each small router 341-350 is to handle 10% or less of the traffic as configured.

Base stations 310-319 comprise any wireless towers, controllers, and/or transmission interfaces that provide wireless service to mobile devices and transport traffic over a backhaul facility. Backhaul facility 330 comprises any media, paths, or facility that transports traffic between base stations 310-319 and small routers 341-350. Backhaul facility 330 may comprise T1 lines, DS-3 lines, or any other electrical or optical lines. Backhaul facility 330 transports traffic using Internet Protocol (IP) in this embodiment, but other similar protocols may be used in other embodiments. Communication node 320 comprises any network node of a telecommunications system that receives traffic from or transmits traffic to base stations 310-319 of wireless network 300. One example of communication node 320 comprises a Mobile Switching Center (MSC).

With communication node 320 as configured, the use of at least ten small routers 341-350 advantageously mitigates the reliability problems of using large routers in the communication node. If one of the small routers 341-350 were to fail, then communication node 320 is assumed to suffer a 10% or less traffic loss. The 10% or less traffic loss satisfies the set of performance metrics provided under the TL 9000 counting rules for suppliers of telecommunication systems, hardware, software, and services.

When in actual operation, base stations 310-319 receive voice or data calls from mobile devices (not shown). Each base station 310-319 transmits traffic (comprising voice, data, or signaling) over backhaul facility 330 to communication node 320. Each small router 341-350 handles traffic received from backhaul facility 330. As previously stated, each small router 341-350 is assumed to handle 10% or less of the traffic for communication node 320 (assuming reasonable load balancing of the traffic across small routers 341-350). If one of the small routers 341-350 does fail in actual operation, then communication node 320 will probably suffer a 10% or less traffic loss (assuming reasonable load balancing among the small routers 341-350). Thus, communication node will probably satisfy the set of performance metrics provided under the TL 9000 counting rules in actual operation.

Therefore, based on the number of small routers 341-350 in communication node 320, a failure of one of the small routers 341-350 is assumed to result in a less than 10% traffic loss in communication node 320 as configured. Similarly, a failure of one of the small routers 341-350 probably results in a less than 10% traffic loss in communication node 320 in actual operation. Suppliers of communication node 320 and other similar telecommunication equipment can then substantially guarantee a maximum traffic outage for communication node 320 to their customers (as configured and in actual operation).

FIG. 4 illustrates another wireless network 400 using IP as the transport protocol over a backhaul facility in an exemplary embodiment of the invention. Wireless network 400 includes geographic regions 402-404 of base stations (B.S) 405-407, an MSC 420, and a backhaul facility 430 connecting the base stations 405-407 to MSC 420. MSC 420 includes twelve small edge routers 441-452. Backhaul facility 430 includes a plurality of T1 lines 431, a Digital Connect (DACS) 434, and a plurality of DS-3 lines 436. The T1 lines 431 connect between DACS 434 and base stations 405-407. The DS-3 lines 436 connect between DACS 434 and small edge routers 441-452. Wireless network 400 uses IP for transmitting traffic over the T1 lines 431 and the DS-3 lines 436. Wireless network 400 may include other networks, systems, or devices not shown in FIG. 4.

Geographic region 402 includes a plurality of base stations 405. Geographic region 403 includes a plurality of base stations 406. Geographic region 404 includes a plurality of base stations 407. Each of base stations 405-407 backhauls traffic to MSC 420 over backhaul facility 430.

Again, small edge routers 441-452 are defined as routers that are to handle 10% or less of the traffic for MSC 420 as configured. The percentage to be handled by each small edge router 441-452 is based on the configuration of MSC 420. MSC 420 has twelve small edge routers 441-452, so each of the twelve small routers is assumed to handle about 8% of the traffic for MSC 420 as configured. Actual traffic in any of small edge routers 441-452 may exceed the 8% level in operation, such as with bursts of traffic during high-traffic times, which falls within the scope of the invention.

When in operation, base stations 405-407 receive voice or data calls from mobile devices (not shown). Each base station 405-407 transmits traffic (comprising voice, data, or signaling) over backhaul facility 430 to MSC 420. Each small edge router 441-452 receives traffic from backhaul facility 430. Each small edge router 441-452 will probably handle 8% or less of the traffic for MSC 420 (assuming reasonable load balancing of the traffic across small edge routers 441-452).

Further reliability is added in wireless network 400 by interleaving the base stations handled by each small edge router 441-452 among the geographic regions 402-404 and other geographic regions not shown. FIG. 5 illustrates interleaving for small edge router 441 in wireless network 400 in an exemplary embodiment of the invention. Small edge router 441 is the only router shown just for illustration. Interleaving refers to spreading out the base stations handled by small edge router 441 among multiple geographic regions and not concentrating the base stations in a geographic region. In FIG. 5, geographic region 402 includes base stations (B.S.) 502-503, geographic region 403 includes base stations 504-505, and geographic region 404 includes base stations 506-507. Different reference numbers are used for base stations 502-507 in FIG. 5 as compared to FIG. 4 to more clearly describe how interleaving works. Although only two base stations 502-503 are shown in geographic region 402 for example, those skilled in the art understand that geographic region 402 includes many other base stations (not shown) to substantially provide wireless service to geographic region 402. Some or all of the other base stations would be handled by the other small edge routers in MSC 420 (see FIG. 4). Wireless network 400 is configured so that small edge router 441 handles traffic from base stations 502-507. Small edge router 441 may handle traffic from other base stations (not shown) in any of geographic regions 402-404, or other geographic regions (not shown).

Instead of configuring wireless network 400 so that small edge router 441 handles traffic from base stations in a single geographic region, such has geographic region 402, wireless network 400 is configured so that the base stations 502-507 handled by small edge router 441 are interleaved among the geographic regions 402-404. Interleaving adds reliability to wireless network 400. If small edge router 441 were to fail, base stations 502-503 in geographic region 402 would be affected, base stations 504-505 in geographic region 403 would be affected, and base stations 506-507 in geographic region 404 would be affected. The other base stations in these geographic regions 402-404 would not be affected and would still be able to backhaul traffic to MSC 420 through the other small edge routers (assuming the other small edge routers in MSC 420 are operating). Therefore, an entire geographic region would not be affected much by one of the small routers failing.

If small edge router 441 fails and its corresponding base stations 502-507 cannot provide service, neighboring base stations may provide service to some of the mobile devices in the service areas of base stations 502-507. When base stations are installed, the service areas of adjacent base stations commonly overlap. A mobile device often communicates with two or more base stations depending in the location of the mobile device. Therefore, if one of the base stations is unable to provide service to the mobile device, the mobile device may still receive service from another adjacent base station.

Wireless network 400 in FIG. 5 is configured so that base stations 502-507 handled by small edge router 441 are not adjacent to one another. Adjacent in this embodiment means that the services areas of two base stations are touching, overlapping, or serving the same mobile device. In geographic region 402, base stations 502 and 503 are not adjacent to one another. In geographic region 403, base stations 504 and 505 are not adjacent to one another. In geographic region 404, base stations 506 and 507 are not adjacent to one another. Separating the base stations 502-507 handled by small edge router 441 adds another level of reliability. If small edge router 441 fails and its base stations 502-507 are not adjacent to one another, the service areas affected will be spread out in the geographic regions 402-404. With the affected service areas spread out and not adjacent to one another, there is an increased chance that a mobile device in the affected service area will receive service from a neighboring base station. In other embodiments, any of base stations 502-507 can be adjacent to one another, but separating the base stations 502-507 adds reliability.

Although twelve small edge routers 441-452 are shown in FIG. 4, the number of small edge routers depends on desired implementations. The use of twelve small edge routers assumes that each router will handle about 8% of the traffic as configured. In operation, a small buffer (2%) is also created so that each small edge router stays under the 10% level in actual operation. The use of twenty small edge routers would assume that each router will handle about 5% of the traffic as configured. In operation, a 5% buffer is created so that each small edge router stays under the 10% level in actual operation. Network designers need to balance the desire to create a large enough buffer to stay under the 10% level in actual operation versus the cost of adding more small edge routers.

The 10% level was also assumed based on the industry standards, such as TL 9000. The customers buying the MSCs may also define a traffic loss threshold other than the 10% industry standard. When a customer defines or agrees to a different threshold other than the 10% threshold, the number of small edge routers in the MSC may be less than ten. The number of small edge routers depends on the threshold, so that each of the small edge routers is to handle the defined threshold or less of the traffic for the MSC as configured. The threshold to be handled by each small edge router is based on the configuration of the MSC. For instance, if the threshold is defined as a 12% or less traffic loss, then the MSC may include eight small edge routers.

I claim:
1. A communication node of a wireless network, the communication node comprising:
at least ten small routers configured to handle traffic received over a backhaul facility from a plurality of base stations providing wireless service to a geographic region, wherein each of the at least ten small routers is to handle ten percent or less of the traffic for the communication node as configured; and wherein each of the at least ten small routers is configured to handle traffic from a set of base stations that are interleaved among the geographic region and that are exclusively non-overlapping and non-adjacent to one another in the geographic region to spread out service areas affected by a failure of an individual one of the at least ten small routers.

2. The communication node of claim 1 wherein the at least ten small routers handle the traffic transported using Internet Protocol (IP).

3. The communication node of claim 1 wherein the communication node comprises a Mobile Switching Center (MSC).

4. A method of operating a communication node of a wireless network, the wireless network comprising the communication node, a plurality of base stations providing wireless service, and a backhaul facility that transports traffic between the plurality of base stations and the communication node, the method comprising:

receiving the traffic in the communication node over the backhaul facility from a plurality of base stations providing wireless service to a geographic region; and handling the traffic in the communication node using n small routers, wherein the number n is defined so that if one of the n small routers fails, the failure causes no more than a 10% traffic loss in the wireless network;

wherein each of the n small routers is configured to handle traffic from a set of base stations that are interleaved among the geographic region and that are exclusively non-overlapping and non-adjacent to one another in the geographic region to spread out service areas affected by the failure of the one of the n small routers.

5. The method of claim 4 wherein receiving the traffic in the communication node comprises:

receiving the traffic in Internet Protocol (IP).

6. The method of claim 4 wherein the communication node comprises a Mobile Switching Center (MSC).

7. A wireless network, comprising:

a plurality of base stations providing wireless service to a geographic region;

a communication node comprising n small routers, wherein the number n is defined so that if one of the n small routers fails, the failure causes no more than a 10% traffic loss in the wireless network; and a backhaul facility that transports traffic between the plurality of base stations and the n small routers of the communication node;

wherein each of the n small routers is configured to handle traffic from a set of base stations that are interleaved among the geographic region and that are exclusively non-overlapping and non-adjacent to one another in the geographic region to spread out service areas affected by the failure of the one of the n small routers.

8. The wireless network of claim 7 wherein the backhaul facility transports traffic using Internet Protocol (IP).

9. The wireless network of claim 7 wherein the communication node comprises a Mobile Switching Center (MSC).

10. The wireless network of claim 7 wherein the backhaul facility comprises:

a Digital Connect (DACS);

a plurality of T1 lines connecting the base stations to the DACS; and a plurality of DS-3 lines connecting the DACS to the n small routers.

* * * * *